US 6,501,852 B1

(12) United States Patent
Clark et al.

(10) Patent No.: US 6,501,852 B1
(45) Date of Patent: *Dec. 31, 2002

(54) METHOD AND COMPONENT FOR SERIALIZATION OF IMAGES

(75) Inventors: David Clark, Woodloes Park (GB); Andrew John Smith, Wellesbourne (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,754

(22) Filed: Mar. 10, 1999

(30) Foreign Application Priority Data

Mar. 18, 1998 (GB) .......................................... 98057235

(51) Int. Cl.⁷ ................................................. G06K 9/00

(52) U.S. Cl. ................. 382/166; 707/103 Y; 707/104.1; 709/202

(58) Field of Search ................................ 382/303–388; 703/2; 345/835; 711/203; 712/225; 707/FOR 104.1, FOR 10; 709/200, 206

(56) References Cited

U.S. PATENT DOCUMENTS

| 5,911,139 A | * | 6/1999 | Jain et al. ..................... 707/103 |
| 5,937,411 A | * | 8/1999 | Becker ......................... 707/103 |
| 6,078,320 A | * | 6/2000 | Dove et al. .................. 345/333 |
| 6,192,159 B1 | * | 2/2001 | Wood et al. ................. 382/245 |

OTHER PUBLICATIONS

Yee "CS 7100 Project 1: Building Interactive Distributed Applications—The Peer–to–Peer Chat System" cc.gatech.edu, fall 1997.*
Yihong et al. "An image database system with fast image indexing capability based on color histograms" TENCON' 94. IEEE Region 10's Ninth Annual International Conference, vol. 11, pp. 407–411, Aug. 1994.*
Dr Dobb's Journal vol. 22, No. 8, Aug. 1997, W Grosso, "Dynamic design patterns in Objective–C: dynamic run times affect how programs are designed and built", pp 38–47.

* cited by examiner

Primary Examiner—Jingge Wu
(74) Attorney, Agent, or Firm—Roy W. Truelson

(57) ABSTRACT

Java™ Development Toolkit version 1.1.x (JDK) does not support the serialization of images. JDK on the other hand allows primitive data types to be serialized. This means that an application developer can design an application so that any primitive data type objects, including objects comprising primitive data type components, can be written to a file or another area of memory, before an application closes. When the application re-opens, the primitive data types can be de-serialized and so recovered and the application can continue as if it had never closed with the exception that image objects will not have been recovered. The invention discloses a component for a development kit comprising means for converting an image object into a primitive data type object and means for serializing that object so that the object can be made persistent. In a preferred embodiment, the component converts an image object to an array of integers representing the image pixels; creates a color table of unique integers from the integer array; converts each integer in the integer array into an index into the color table; and zip compresses the combined color table and array of indices before serialization.

11 Claims, 2 Drawing Sheets

METHOD AND COMPONENT FOR SERIALIZATION OF IMAGES

FIELD OF THE INVENTION

The present invention relates to computer software applications, and in particular to a method and component for serialization of images.

BACKGROUND OF THE INVENTION

The Java™ Development Toolkit version 1.1.x (JDK) does not support the serialization of images. That is, the standard built-in mechanism for capturing and storing the state of an object has not been applied/to the java.awt.Image class.

JDK on the other hand allows primitive data types to be serialized. This means that an application developer can design an application so that any primitive data type objects, including objects comprising primitive data type components, can be written to a file or another area of memory, before an application closes. When the application re-opens, the primitive data types can be de-serialized and so recovered and the application can continue as if it had never closed with the exception that image objects will not have been recovered.

A conventional solution to this problem is for a developer to create a reference to any image file used in an application. The reference being a string can be serialized and thus the image can be made persistent by re-loading the file at the reference when an application re-opens. This method, however, is inconvenient for any Java class that has one or more images as class data members and wishes to support serialization itself as it requires extra programming and also relies on the same image remaining at the same location every time the application opens.

SUMMARY OF THE INVENTION

Accordingly, the present invention provides a component for a development kit comprising means for converting an image object into a primitive data type object and means for serializing that object so that the object can be made persistent.

Since all primitive Java types support serialization, the invention allows images to be indirectly serialized by converting them to a primitive data type, and serializing that data type. On reconstruction of a class instance via de-serialization, the primitive data type is reconstructed, and then converted back to an image.

There are standard mechanisms within the JDK to convert an image to an array of integers, and to create an image from an array of integers. A problem with simple conversion from image to integer array and back again is the Volume of data involved. With Java, images are typically loaded from GIF (graphics interchange format) or JPEG data streams, which are converted into a standard format in memory by the Java image classes. This format requires 32 bits of information for each pixel in the image: 8 bits for each of the red, green and blue color planes, and a further 8 bits for the alpha plane that controls transparency. The in-memory representation of an image is therefore considerably larger than the originating GIF or JPEG data stream. Serialization of this representation without compression results in very large serialized data sets.

The GIF format is a lossless compression format that supports up to 256 unique colors. The JPEG format can provide more aggressive compression, and supports more than 256 unique colors, but is a lossy format. An image stored as a JPEG data stream and then reconstituted will not be identical to the original. For the purposes of serialization, a process that may well be repetitive, a lossless compression mechanism is required. The GIF compression is well known, however an alternative industry standard lossless compression mechanism exists in the public domain. Commonly know as Zip, several implementations exist in products. More importantly, an implementation is available as part of the JDK.

Thus, in a further aspect, the present invention provides a component further comprising means adapted to compress the primitive data type object before serialization.

By compressing the array of integers obtained from an image using the built-in Zip facility of the JDK, some useful compression can be obtained. In some cases the degree of compression is better than the original GIF data stream, especially with small images. However, in many cases the degree of compression is not as good. This is not surprising, since the Zip algorithms are general purpose, and have no specialized knowledge of the image data that they are compressing.

Thus, in a further aspect the present invention provides a component further comprising: means adapted to convert said image object to an array of integers representing the image pixels; means adapted to create a color table of unique integers from the integer array; means adapted to convert each integer in the integer array into an index into the color table: wherein said compression means is adapted to compress the combined color table and array of indices.

This aspect of the invention provides a component for compressing images, without data loss, that is more effective than the industry standard GIF format.

In this aspect, a color table of the unique colors that exist in the image is created, and image pixels are represented as indices into the color table. Depending on the number of unique colors, the number of bits required to hold each index may be much less than the 32 bits required to represent the pixel color itself. In the case of images originating from a GIF data stream, where a maximum of 256 colors are supported, each index need only ever be 8 bits. For images of greater color depth, various schemes may be employed to limit the number of bits required for each index.

BRIEF DESCRIPTION OF THE PREFERRED EMBODIMENTS

Figure 1A:
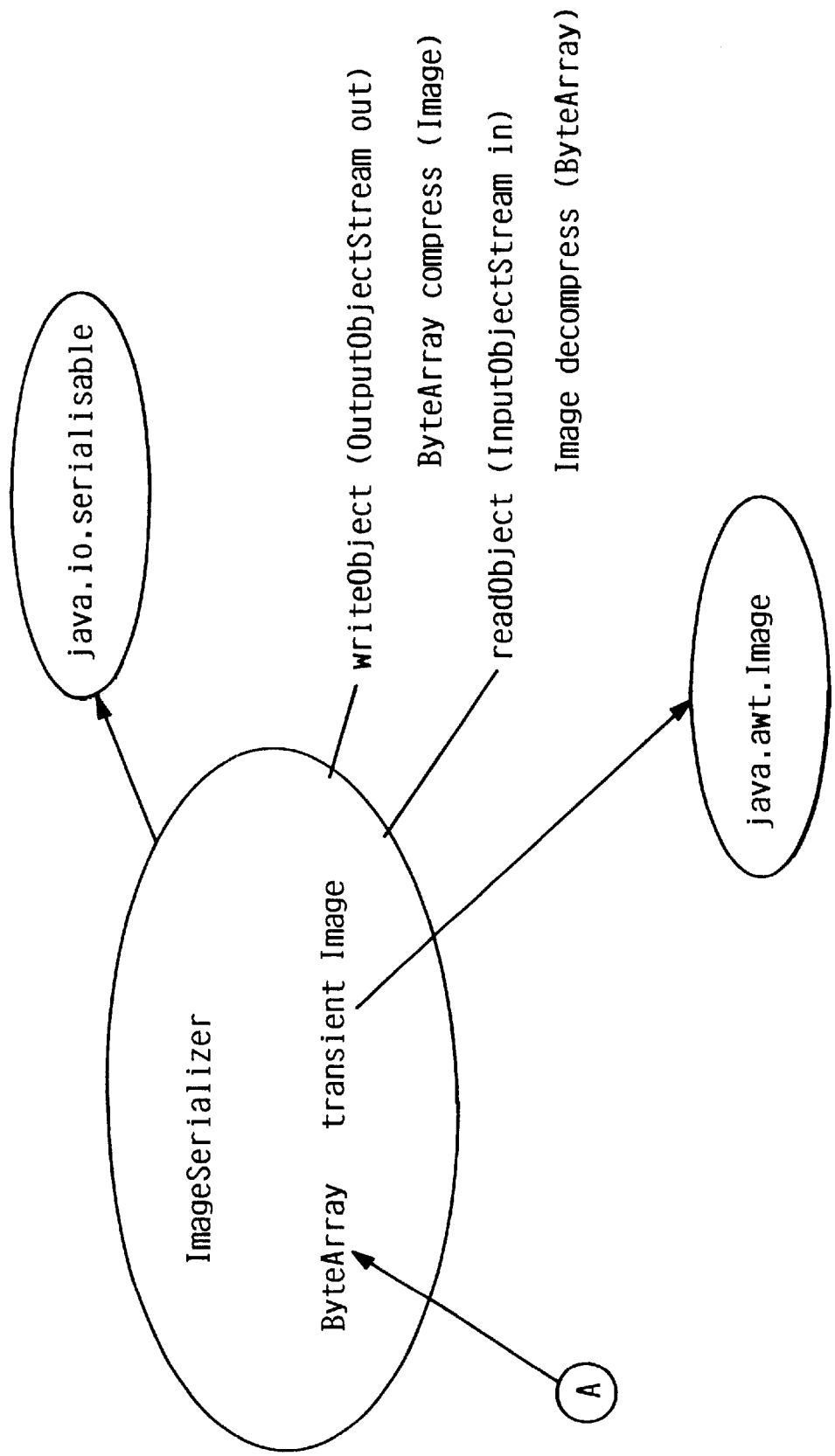
FIG. 1 is a diagram illustrating the class and associated data structure, according to the preferred embodiment of the invention.
Figure 1B:
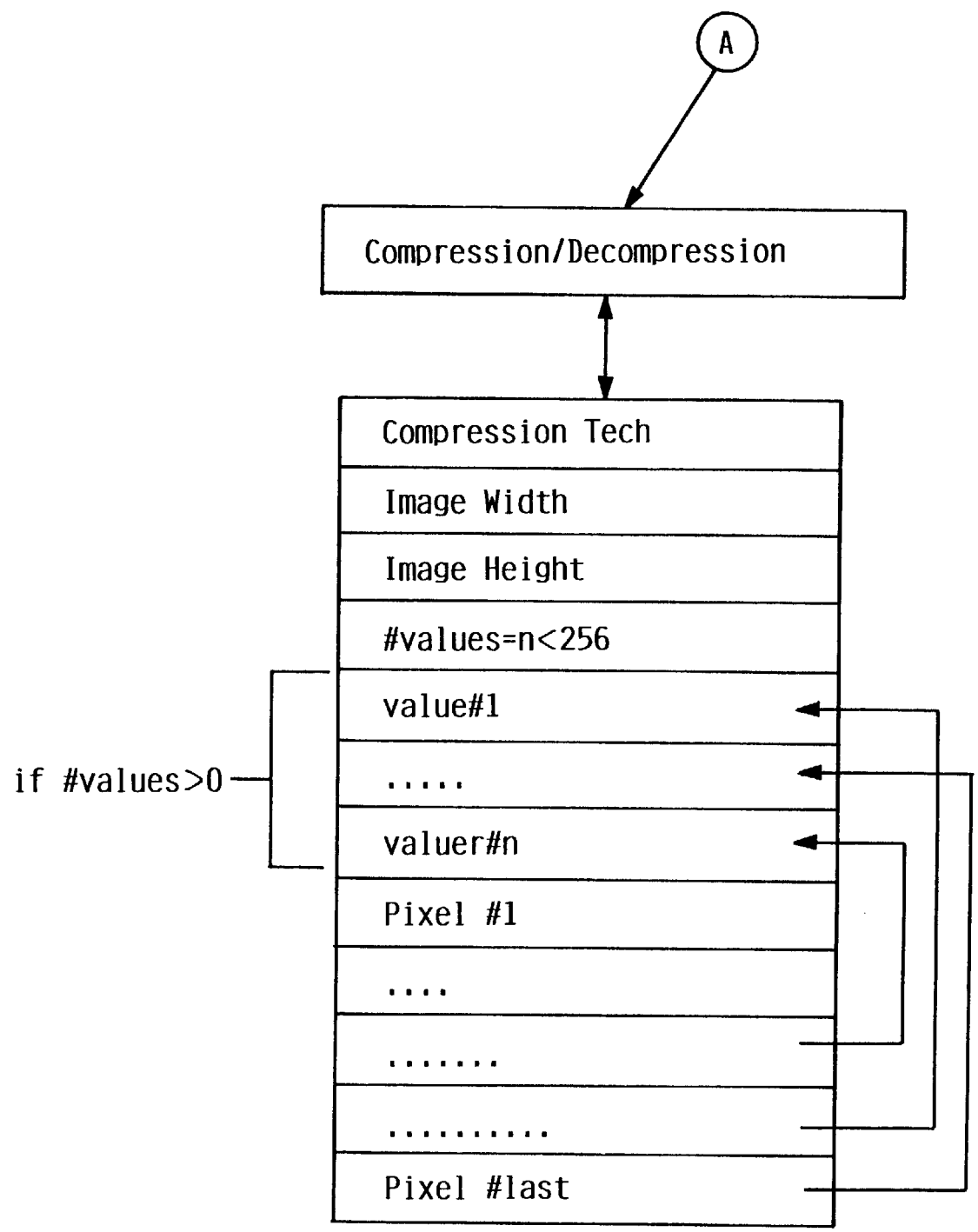

An embodiment of the invention using the Java programming language and JDK, although the invention is not limited to the Java development kit, will now be described with reference to the accompanying drawing which is a diagram illustrating the class and associated data structure of the embodiment of the invention.

An ImageSerializer class encapsulates a java.awt.Image as a class data member referred to hereafter as Image. ImageSerializer provides methods to access the encapsulated Image, and implements the java.io.Serializable interface. This interface prescribes two methods: writeObject ( ) and readObject ( ). These methods are implemented primarily using compression and decompression methods described below.

The ImageSerializer class has two class data members: Image, which is marked transient since images do not support serialization, and ByteArray used to hold compressed image data. ImageSerializer takes advantage of the built-in capability of the JDK to serialize all primitive types including byte arrays by converting the image to a byte array prior to serialization, and the byte array to an image after de-serialization.

In more detail, the writeObject ( ) method receives an OutputObjectStream, which is used to store the serialized form of the class instance. writeObject ( ) should ensure that any image has been completely loaded before conversion to a byte array. Preferably, this can be done using the waitForAll method on the Java.awt.MediaTracker class. The image is then passed to a static compress ( ) method to convert the image data to a compressed byte array. The resulting byte array is then serialized, along with any other serializable data, by calling the standard defaultWriteObject ( ) method provided by the JDK which serializes all serializable data members, including ByteArray, and writes them to OutputObjectStream.

Conversely, the readObject ( ) method receives an InputObjectStream where serialized data is held, and provides retrieval of the serialized form of the class instance. In readObject ( ), the standard defaultReadObject ( ) method provided by the JDK is first called to unserialize data held in InputObjectStrem. Following this the ByteArray class data member will have been de-serialized. ByteArray is then passed to a static decompress ( ) method to convert ByteArray to an image. The resulting image is then assigned to the Image transient class data member ready to be accessed by the class user.

The compress ( ) method is provided with Image and compresses it into ByteArray, using the following steps:

1. Using standard JDK facilities, convert Image into an array of integers, each integer representing one pixel from the image.

2. Using a standard JDK java.util.Hashtable, determine the unique pixel values within the array of integers. The integer value of each pixel acts as a unique key into the hashtable.

3. At this point a decision is made according to the number of unique pixel values detected. In the present embodiment, if there are more than 256, then palettization is bypassed, and the integer pixel representations are converted to byte quadruplets.

4. Regardless of palettization, a pre-compression byte array is populated with four control values, each occupying four bytes: the compression technique used which may, for example, indicate a compression method other than zip or a more sophisticated palettization scheme; the image width; the image height; and the number of unique colors in the image (0 if palettization is not used).

5. If palettization is used, the pre-compression byte array is then further populated with the unique colors indices (the color table) each represented by four bytes.

6. The pre-compression byte array is then also further populated with the single byte indices pointing to entries in the color table.

7. The entire pre-compression byte array is then compressed using the standard java.util.zip.Deflater class to apply standard zip compression to the pre-compression byte array and this is returned as ByteArray.

The decompress ( ) method is the inverse of the compress ( ) method. It receives ByteArray and decompresses it, and then uses the result to create and return Image. This process has the following steps:

1. ByteArray is decompressed using the standard java.util.zip.Inflater class to apply standard zip decompression to ByteArray and produce a post-compression byte array.

2. The four control values described above are then extracted from the post-compression byte array.

3. If the number of unique colors is greater than zero, the color table is reconstructed using that number of colors.

4. If palettization was specified, the data in the post-compression byte array are interpreted as indices into the color table, and they are used to recreate the original pixel values. If no palettization was employed, the remaining data in the byte array are interpreted as four-byte color values, and are used to recreate the original pixel values directly.

5. The resulting array of integers representing the image pixels is then used to create and return Image, using standard JDK facilities.

Palettization affords significant compression in itself, and even more when the resulting color table and array of indexes are subjected to Zip compression. Table 1 illustrates some typical compression results compared to the size of the original GIF data stream. The column headings are as follows: Image Size is the in-memory size of an image loaded from the GIF; Zipped GIF shows the size of the GIF data stream after zip compression has been applied; Zipped Pixels shows the size of the integer array of pixels after zip compression has been applied; and Palettized & Zipped shows the result of first palettizing the image pixels, and then applying zip compression to the color palette and array of indexes. It can be seen that by palettizing and compressing the results, significant compression savings are made over and above that of the original GIF data stream. These results make this technique suitable for the serialization of images.

TABLE 1

Representative compression comparisons using the invention

| Name | Orig GIF Size | Dimensions | Image Size | Zipped GIF | Zipped Pixels | Palettized & Zipped |
|---|---|---|---|---|---|---|
| star.gif | 880 | 20 × 18 | 1440 | 135 | 102 | 83 |
|  |  |  |  | 84.66% | 88.41% | 90.57% |
| bulb.gif | 1750 | 51 × 40 | 8160 | 1286 | 1370 | 1180 |
|  |  |  |  | 26.51% | 21.71% | 32.57% |
| jcr.gif | 4049 | 342 × 52 | 71136 | 3425 | 3846 | 2792 |
|  |  |  |  | 15.41% | 5.01% | 31.04% |
| bilevel.gif | 4057 | 265 × 192 | 203520 | 3352 | 3893 | 2957 |
|  |  |  |  | 17.38% | 4.04% | 27.11% |
| vangogh.gif | 10363 | 296 × 137 | 162208 | 9683 | 11956 | 9641 |
|  |  |  |  | 6.56% | −15.37 | 6.97% |

TABLE 1-continued

Representative compression comparisons using the invention

| Name | Orig GIF Size | Dimensions | Image Size | Zipped GIF | Zipped Pixels | Palettized & Zipped |
|---|---|---|---|---|---|---|
| hci.gif | 11834 | 185 × 81 | 59940 | 11669 | 14703 | 10971 |
|  |  |  |  | 1.39% | −24.24 | 7.29% |
| gauges.gif | 18569 | 109 × 221 | 96356 | 18511 | 21980 | 16990 |
|  |  |  |  | 0.31% | −18.37 | 8.50% |
| kingfish.gif | 234623 | 640 × 480 | 228800 | 232080 | 269885 | 203876 |
|  |  |  |  | 1.08% | −15.03 | 13.10% |

What is claimed is:

1. A method of providing a computer programming application in an object-oriented computer programming language, comprising the steps of:

providing a serialization class of an object-oriented class hierarchy, said serialization class supporting serialization of images, said serialization class containing an image class data member, a primitive data type class data member, and at least one serialization method for automatically serializing image data;

converting data representing an image in an object which is an instance of said image class data member into data representing said image in an object which is an instance of said primitive data type class data member, said data representing said image in an object which is an instance of said primitive data type class member comprising an array of integers representing the image pixels;

creating a color table of unique integers from the integer array;

converting each integer in the integer array into an index into the color table;

compressing data representing said image in the object which is an instance of said primitive data type class data member before serialization, said compressing step including the step of compressing the combined color table and array of indices; and serializing said object which is an instance of said primitive data type class data member so that the object can be made persistent;

wherein said converting and said serializing steps are performed by said at least one serialization method of said serialization class supporting serialization of images.

2. The component as claimed in claim 1, wherein said step of compressing said combined color table and array of indices is performed using a general data compression algorithm which is not optimized for image compression.

3. A method as claimed in claim 1, wherein said object-oriented computer programming language is a version of Java.

4. A method as claimed in claim 1, further comprising the steps of:

de-serializing said object which is an instance of said primitive data type class data member; and converting data representing an image in the de-serialized object which in an instance of said primitive data type class data member to image data in an object which is an instance of said image class data member so that the image can be displayed;

wherein said de-serializing and converting data representing an image in the de-serialized object steps are performed by at least one de-serialization method of said serialization class.

5. A component for an application in an object-oriented programming language, comprising:

a serialization class of an object-oriented class hierarchy, said serialization class supporting serialization of contents of unserializable objects, said serialization class containing a first class data member, and a second class data member, and at least one serialization method for automatically serializing data contained in objects of said first class data member, wherein objects of said first class data member are unserializable, and wherein objects of said second class data member are primitive data types and are serializable; and wherein said at least one serialization method converts the contents of an object which is an instance of said first class data member to the contents of an object which is an instance of said second class data member and serializes the object which is an instance of said second class data member so that the object can be made persistent, wherein said at least one serialization method performs the steps of:

(a) converting image data in an object which is an instance of said first class data member to an array of said primitive data type, (b) generating a color table for image data in an object which is an instance of said first class data member, (c) converting each value of said array into an index value in said color table to generate an array of indices, and (d) compressing said color table and said array of indices.

6. The component as claimed in claim 5, wherein said image is derived from a GIF (graphics interchange format) file.

7. The component as claimed in claim 5, wherein said image is derived from a JPEG file.

8. The component as claimed in claim 5, wherein said step of compressing said color table and said array of indices is performed using a general data compression algorithm which is not optimized for image compression.

9. The component as claimed in claim 8, wherein said general data compression algorithm is a zip algorithm.

10. A method as claimed in claim 2 wherein the compressing step includes the step of zipping the data type object before serialization.

11. The component as claimed in claim 5, wherein said object-oriented programming language is a version of Java.

* * * * *